UNITED STATES PATENT OFFICE.

W. A. REASON, OF CHICAGO, ILLINOIS.

IMPROVED COMPOSITION FOR FORMING BLACKBOARDS, SLATES, &c.

Specification forming part of Letters Patent No. 44,456, dated September 27, 1864.

*To all whom it may concern:*

Be it known that I, W. A. REASON, of Chicago, in the county of Cook and State of Illinois, have invented a new and useful Improvement in Liquid Slate; and I do hereby declare that the following is a full, clear, and exact description thereof.

My invention has reference to the manufacture of a preparation known as "liquid slate," which is spread upon the walls of schoolrooms and other suitable surfaces, and when thoroughly dried is used instead of blackboards for the purposes of mathematical demonstration or illustration and other appropriate uses.

To enable those skilled in the art to manufacture and use my invention, I will proceed to describe the same with particularity. In the first place, however, I will state the materials of which the article has heretofore been made. They are alcohol, gum-shellac, lamp-black, and pumice-stone.

The great difficulty in the manufacture of liquid slate heretofore has been that when heavy grits—as pumice-stone and other grits which are hard enough to answer the purpose—are used alone their specific gravity is so great that they are precipitated to the bottom in a mass, and the mixture or preparation has to be stirred up continually to render it fit for use, and even then the pumice-stone would be unevenly distributed throughout the mass, so that it was impossible to prepare a wall with a coat or layer of a uniform character, some parts of the wall having an abundance of the gritty material and other parts having hardly any at all, thus causing the board or slate to wear out by piecemeal and to require constant repairs. On the other hand, the lighter grits, which would remain suspended in the preparation, are not hard enough to answer the purpose, and when used would not last long enough to make it worth the while to put it on.

My invention therefore consists in combining the hard and heavy grits with the softer and lighter grits in such proportions as will render the specific gravity of the compound such that it will remain suspended uniformly throughout the preparation, while at the same time the slate will be hard and durable, and thus enabling one to put on an even and uniform coating of the grits, which will wear uniformly and not require constant repairs, as before.

My invention further consists in adding to the mixture resin and alkali, by means of which I am able to produce an article of the same quality at a much less expense.

I prepare my liquid slate as follows: I take one pound of gum-shellac and one pound of resin and put the same into a suitable vessel. I then take one quart of water and dissolve in it one-fourth of a pound of sal-soda. I then pour this mixture of water and sal-soda upon the gum-shellac and resin, and heat the whole until the gum and resin are thoroughly dissolved. I then add one gallon and a half of alcohol and let the mixture cool. I then take one-fourth of a pound of pumice-stone, one-fourth of a pound of rotten-stone, and one-half of a pound of charcoal, (the rotten-stone and charcoal being light grits,) to which I add one-half pound of lamp-black, and grind them all up together, thoroughly mixing and mingling the whole into a uniform homogeneous mass. This pulverized mixture of pumice-stone, rotten-stone, charcoal, and lamp-black is then put into the liquid mixture, before prepared as aforesaid, and stirred in thoroughly until the grits and lamp-black are uniformly diffused throughout the mass, when the liquid slate is ready for use. It is not absolutely necessary that the different grits should be ground together, though I consider that an effectual mode of combining them.

As the qualities of the ingredients used vary, of course the proportions herein stated must vary also, as the proportions given serve only as a general statement, which may be varied to suit occasions.

What I claim as my invention is—

1. The employment of a combination of light and heavy grits in the manufacture of liquid slate, substantially as and for the purposes specified.

2. The combination of gum-shellac, resin, alcohol, and alkali with the grits and lamp-black, as and for the purposes specified and described.

W. A. REASON.

Witnesses:
 W. E. MARRS,
 F. H. BROWN.